US008208088B2

(12) United States Patent
Zhang

(10) Patent No.: US 8,208,088 B2
(45) Date of Patent: Jun. 26, 2012

(54) LIQUID CRYSTAL DISPLAY PANEL AND A METHOD OF ASSEMBLING THEREOF

(75) Inventor: Jun Zhang, Suzhou (CN)

(73) Assignees: AU Optronics (Suzhou) Corp., Ltd., Suzhou (CN); AU Optronics Corporation, Hsin-Chu (TW)

( * ) Notice: Subject to any disclaimer, the term of this patent is extended or adjusted under 35 U.S.C. 154(b) by 505 days.

(21) Appl. No.: 12/332,364

(22) Filed: Dec. 11, 2008

(65) Prior Publication Data

US 2009/0153772 A1 Jun. 18, 2009

(30) Foreign Application Priority Data

Dec. 12, 2007 (CN) .......................... 2007 1 0199746

(51) Int. Cl.
*G02F 1/1333* (2006.01)
(52) U.S. Cl. ......................................................... 349/58
(58) Field of Classification Search ........................ None
See application file for complete search history.

(56) References Cited

U.S. PATENT DOCUMENTS

| 6,222,597 | B1* | 4/2001 | Muramatsu ..................... 349/58 |
| 6,342,933 | B1* | 1/2002 | Nakamura et al. ............. 349/58 |
| 6,411,353 | B1* | 6/2002 | Yarita et al. ................... 349/59 |
| 7,137,705 | B2* | 11/2006 | Kitabayashi ................... 353/31 |
| 7,192,177 | B2 | 3/2007 | Chang et al. |
| 2001/0002145 | A1* | 5/2001 | Lee et al. ....................... 349/58 |
| 2008/0089018 | A1 | 4/2008 | Kim |
| 2009/0033825 | A1* | 2/2009 | Fukayama et al. ............. 349/58 |

FOREIGN PATENT DOCUMENTS

| CN | 101149499 A | 3/2008 |
| JP | 2005078832 A | 3/2005 |
| TW | 567362 | 12/2003 |

OTHER PUBLICATIONS

Machine translation of JP 04-83224 abstract only.*

* cited by examiner

*Primary Examiner* — Lucy Chien
(74) *Attorney, Agent, or Firm* — CKC & Partners Co., Ltd.

(57) ABSTRACT

A liquid crystal display module includes a backlight unit, a circuit board, a frame and at least one elastic part. The circuit board is disposed on one surface of the backlight unit. The frame covers over the circuit board. Furthermore, the elastic part is positioned between the circuit board and the frame. Before assembling, the elastic parts have a plurality of continuous cross-sections along with a perpendicular direction of the surface of the backlight unit and the continuous cross-sections have different area values.

10 Claims, 3 Drawing Sheets

LIQUID CRYSTAL DISPLAY PANEL AND A METHOD OF ASSEMBLING THEREOF

RELATED APPLICATIONS

This application claims priority to Chinese Application Serial Number 200710199746.X, filed Dec. 12, 2007, which is herein incorporated by reference.

BACKGROUND

1. Field of Invention

The present invention relates to a display. More particularly, the present invention relates to a liquid crystal display panel and a method of assembling thereof.

2. Description of Related Art

The liquid crystal display panels are assembled by first mounting a circuit board on the backlight unit either by screwing or tenoning and then providing a frame to cover the circuit board and the backlight unit for protection. However, such method needs an operator to touch the circuit board manually and assemble the circuit board on the backlight unit. This might result in damage to the electrical properties of the circuit board when a person comes into contact with the circuit board. In addition, while disassembling the frame, the electrical connection components might be torn down because too much force is used. Furthermore, no matter whether the LCD is being assembled or dissembled, the conventional method is too complex, and the procedures must be performed step by step. As a result, it is time-consuming and increases the cost of production or maintenance.

For the forgoing reasons, it is necessary to develop a method of assembling a liquid crystal display panel to not only simplify the process, but also reduce people's contact and improve the shortcomings of the conventional method.

SUMMARY

The present invention is directed to a method of assembling a liquid display panel to simplify the process of fabrication.

It is therefore an objective of the present invention to provide a backlight unit, a circuit board, a frame, and an elastic part. The circuit board is arranged on a side of the backlight unit. The frame covers the circuit board and the backlight unit. The elastic part is arranged between the circuit board and the frame. Before assembling the frame, in a parallel direction to a perpendicular direction of the side of the backlight unit, the elastic part has a plurality of continuous lateral cross-sections, and the areas of the plurality of continuous lateral cross-sections are different.

It is another objective of the present invention to provide a method of assembling a liquid crystal display panel. First, a backlight unit is provided. Then, a circuit board is arranged on a side of the backlight unit. After that, a frame is used to cover the circuit board and the backlight unit and at least one elastic part is arranged between the circuit board and the frame.

Accordingly, since the elastic part is arranged between the circuit board and the frame, elasticity of the elastic part may press and secure the circuit board to the backlight unit. Hence, the assembly process is simplified and assembly time decreased thereby reducing the production cost. The decrease of manual contact may further decrease damage to the products. In addition, since the elastic part is electrically connected to the ground position of the circuit board, it can directly contact with the frame and provide electromagnetic protection.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE EMBODIMENTS

Figure 1A:
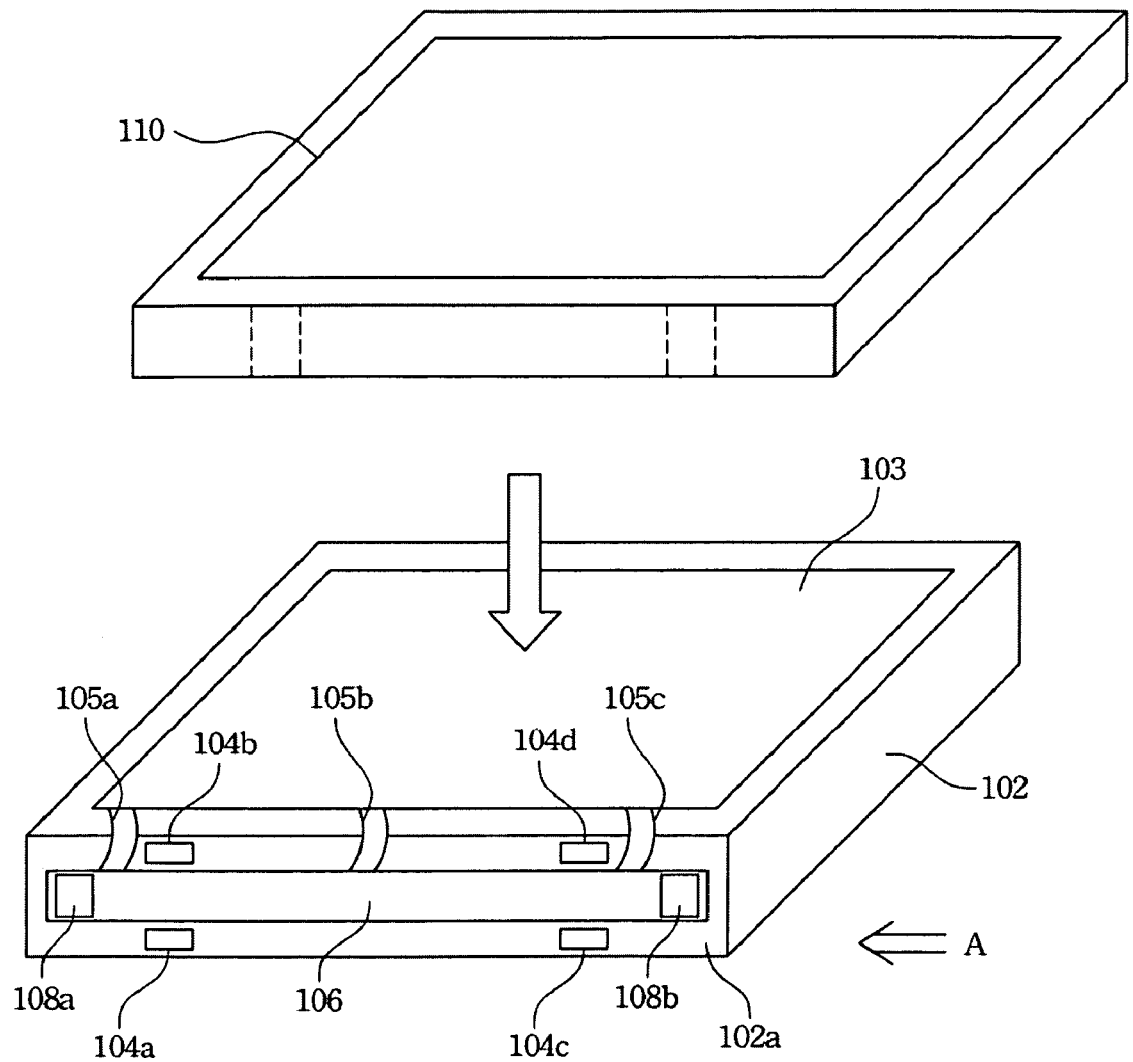
FIG. 1A is a schematic view of a liquid crystal display panel according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
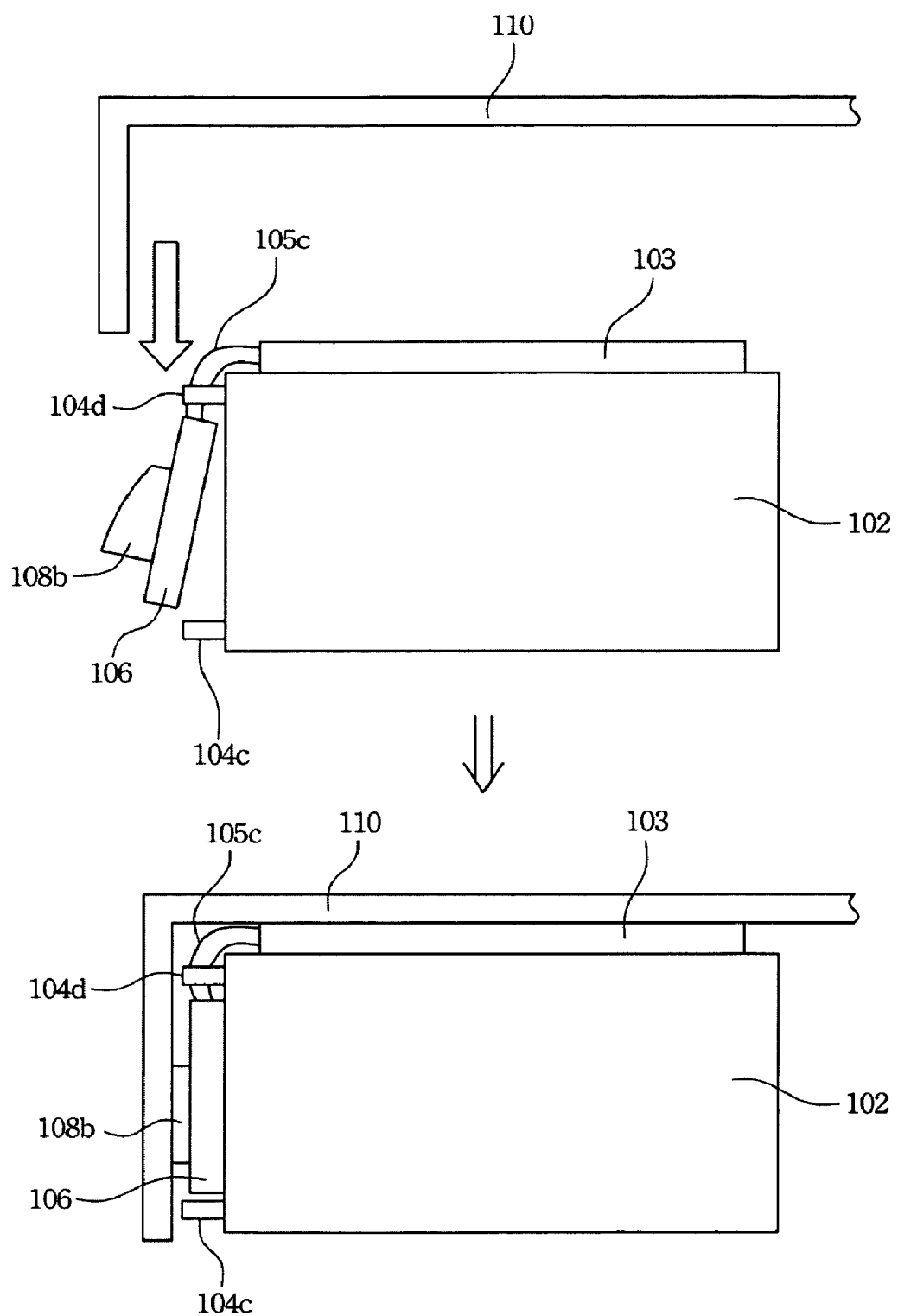
FIG. 1B is a side view of FIG. 1A.

In order to describe the procedure of assembling the liquid crystal display panel provided in one of the embodiments more detail, please refer to FIG. 1A and FIG. 1B at the same time so that each step can be understood more easily. FIG. 1B is a side view, taken along arrow A in FIG. 1A. The process of assembling generally comprises the following steps: providing a backlight unit 102. As shown in FIG. 1A, the backlight unit 102 has a liquid crystal unit 103 arranged thereon. A plurality of blocks 104a, 104b, 104c and 104d may be optionally disposed on one side 102a of the backlight unit 102, and opposite each other two by two. Disposing a circuit board 106 on the side 102a of the backlight unit 102 between the blocks 104a, 104b, 104c and 104d, so that the circuit board 102 will not move up and down. The circuit board 106 may be connected to the liquid crystal unit 103 by the electrical connection components 105a, 105b and 105c. Electrically connecting the elastic parts 108a, 108b are to the ground position of the circuit board 106. Providing a frame 110 to cover the circuit board 106 and the backlight unit 102, so that the elastic parts 108a and 108b are between the circuit board 106 and the frame 110. As a result, elasticity of the elastic parts not only enhances the attachment of the circuit board 106 to the backlight unit 102, but also applies a force to the frame 110, which attaches the frame 110 to the backlight unit 102 and the circuit board 106. In addition, since the elastic parts 108a and 108b are connected to the ground position of the circuit board 106, the elastic parts 108a are 108b are in direct contact with the frame 10 and are grounded with the frame 110, after the frame 110 is assembled. Therefore, electromagnetic interference protection is provided.

Figure 2A:
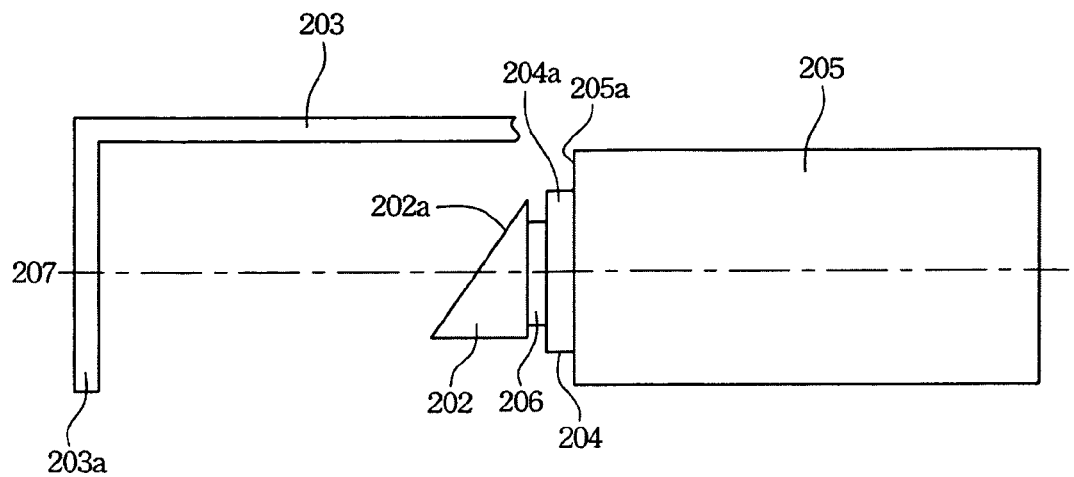
FIG. 2A is a cross section view of the arrangement of the elastic parts according to one embodiment of the present invention.

In the following, the shape of the elastic parts and the arrangement thereof will be described more clearly. Please refer to FIG. 2A. FIG. 2A illustrates a cross section view of the arrangement of the elastic parts according to one embodiment of the present invention. As shown in FIG. 2A, before assembling, the longitudinal cross section of the elastic parts 202 is wedge-shaped, and therefore the elastic part 202 has an incline 202a. That is, the thickness of the elastic part 202 gets thicker from up to down. Therefore, the shape and the area along the continuous lateral cross-sections of the elastic parts 202 from up to down change gradually in the direction parallel to the perpendicular direction 207 of the side 205a of the backlight unit 205.

During assembly, the elastic part 202 is adhered to the ground position of the circuit board 204 by the conductive adhesive 204. Certainly, according to needs in practice, the person skilled in the art may use other methods to secure the elastic parts 202 onto the circuit board 204. After that, while the frame 203 is assembled, the frame 203 may be clipped to the backlight unit 205 along the incline 202a from up to down to avoid resistance, and the compression of the elastics part 202 is increased from up to down as the thickness of the elastics part 202 get thicker. The elastic part 202 is pressed between the circuit board 204 and the frame 203 by elasticity which further secures the circuit board 204 and the frame 203. Therefore, the assembly procedures are simplified and the production cost and manual contact are reduced which further decreases damage to the products.

Figure 2B:
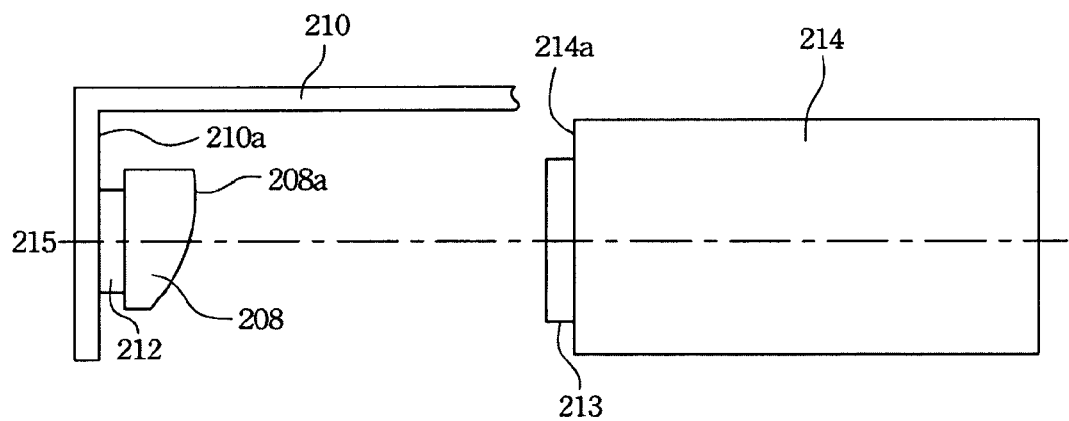
FIG. 2B is a cross section view of the arrangement of the elastic parts according to one embodiment of the present invention.

Refer to FIG. 2B. FIG. 2B illustrates another method of assembling provided in one embodiment of the present invention. As shown in FIG. 2B, before assembling, the elastic part 208 has a cambered surface 208a and the thickness thereof is gets thinner gradually from up to down. Hence, along the direction parallel to the perpendicular direction 215 of the side 214a of the backlight unit 214, the shape and the area of the continuous lateral cross-sections of the elastic parts 208 from up to down change gradually. Moreover, as shown in FIG. 2B, while assembling, the elastic part 208 may be adhered to the inner side 210a of the frame 210 by the conductive adhesive 212 or the elastic part 208 may be attached to the inner side 210a of the frame 210 by any other suitable method. The assembling method shown in FIG. 2B is different from that of FIG. 1A. Certainly, the elastic part 208 and the frame 210 may be integrally formed by injection molding. According to needs in practice, the person skilled in the art may use other methods to secure the elastic part 208 onto the inner side 210a of the frame 210. As a result, by using the cambered surface 208a provided by the elastic part 208, the frame 210 can easily be clipped with the circuit board 213 and the backlight unit 214 to reduce friction.

Figure 2C:
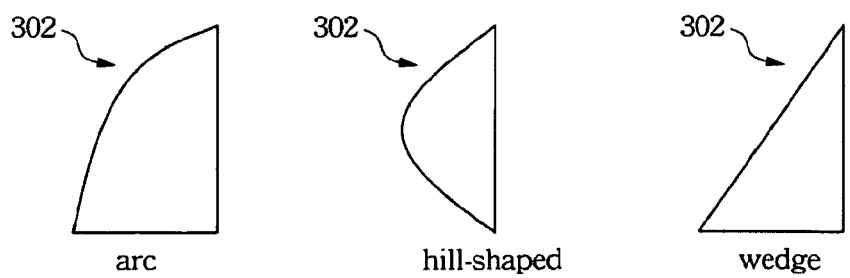
FIG. 2C is a variety of elastic parts according to one embodiment of the present invention.

In FIG. 2C a longitudinal cross section view of a variety of elastic parts according to one embodiment of the present invention is shown. As shown in FIG. 2C, the longitudinal cross section of the elastic part 302 can be an arc, wedge, or hill-shaped with a convex central portion and it can be made of foam, rubber, conductive foam or conductive cloth tape.

According to above, an assembly method is provided so that the elasticity of the elastic parts secures a circuit board to the backlight. Hence, it can eliminate the step of screwing the circuit board to the backlight unit. The assembly procedures are simplified and the time consumed and manual contact are both reduced which further decreases damage to the products. In addition, since the upward and downward movements of the circuit board are limited by the blocks, the electrical connection components can be prevented from being torn off while assembling or disassembling the frame which might pull the circuit board.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   a backlight unit;
   a circuit board arranged on a side of the backlight unit;
   a frame covering the circuit board and the backlight unit; and
   at least one elastic part having opposite sides, one of which abuts against the circuit board, and another of which abuts against the frame,
   wherein before assembling the frame, along a direction parallel to a perpendicular direction of the side of the backlight unit, the elastic part has a plurality of continuous lateral cross-sections, and areas of the plurality of continuous lateral cross-sections are different;
   wherein after assembling the frame, the areas of the plurality of continuous lateral cross-sections are substantially the same.

2. The liquid crystal display panel of claim 1, wherein the elastic part is made of foam, rubber, conductive foam or conductive cloth tape.

3. The liquid crystal display panel of claim 1, wherein a longitudinal cross section of the elastic part is an arc, wedge, or hill-shape.

4. The liquid crystal display panel of claim 1, wherein the elastic part is electrically connected to a ground position of the circuit board.

5. The liquid crystal display panel of claim 1, further comprising at least two blocks oppositely arranged around the backlight unit.

6. The liquid crystal display panel of claim 1, further comprising a conductive adhesive to adhere the elastic part to the circuit board.

7. The liquid crystal display panel of claim 1, comprising a conductive adhesive to adhere the elastic part to the frame.

8. A method of assembling a liquid crystal display panel, comprising:
   providing a backlight unit;
   disposing a circuit board on a side of the backlight unit;
   providing a frame to cover the circuit board and the backlight unit; and
   wherein at least a elastic part has opposite sides, one of which abuts against the circuit board, and another of which abuts against the frame;
   wherein after providing the frame to cover the circuit board and the backlight unit, the elastic part has a width between the opposite sides of the elastic part, and the width is substantially the same along the entire elastic part.

9. The method of claim 8, wherein
   the elastic part is adhered to a ground position of the circuit board by a conductive adhesive.

10. The method of claim 8, wherein the elastic part is adhered to an inner side of the frame by a conductive adhesive.

* * * * *